US005601206A

United States Patent [19]
Haas et al.

[11] Patent Number: 5,601,206
[45] Date of Patent: Feb. 11, 1997

[54] TRUCK BOX

[75] Inventors: Joel C. Haas; Michael D. Howell, both of Jupiter, Fla.; David G. Mann; Matthew P. Williams, both of Wooster, Ohio

[73] Assignee: Rubbermaid Specialty Products, Inc., Wooster, Ohio

[21] Appl. No.: 469,074

[22] Filed: Jun. 6, 1995

[51] Int. Cl.⁶ .............................. B65D 25/00; B65D 1/34; B65D 43/16; B60R 9/00
[52] U.S. Cl. .......................... 220/527; 220/528; 220/324; 220/533; 220/544; 220/264; 220/338; 220/343; 220/675; 220/499; 220/514; 220/372; 220/373; 16/254; 16/378; 16/380; 16/382; 16/DIG. 13; 224/402; 224/404; 292/123; 292/126; 292/97
[58] Field of Search .................................. 220/260, 262, 220/263, 264, 334, 337, 338, 343, 352, 529, 532, 533, 544, 549, 553, 554, DIG. 15, 342, 651–653, 669, 675, 23.83, 23.86, 23.4, 323, 527, 324, 528, 326; 224/402–404, 552, 566; 292/123, 126, 97, 100, 113, 119, 129; 206/499, 514, 372, 373, 519, 511, 512, 505, 504, 557; 16/254, 378, 380, 382, DIG. 13; 217/17, 21, 22, 26, 29

[56] References Cited

U.S. PATENT DOCUMENTS

| D. 243,393 | 2/1977 | Wynn | D12/157 |
|---|---|---|---|
| 1,503,894 | 8/1924 | Hamilton . | |
| 1,794,786 | 3/1931 | McBride et al. . | |
| 1,926,162 | 9/1933 | Moberly | 217/7 |
| 2,243,772 | 5/1941 | Peltier | 292/11 |
| 2,312,578 | 3/1943 | Northrup et al. | 292/48 |

(List continued on next page.)

FOREIGN PATENT DOCUMENTS

| 2030143 | 5/1992 | Canada | 224/404 |
|---|---|---|---|
| 1429618 | 3/1969 | Germany | 220/529 |
| 2128245 | 9/1982 | United Kingdom . | |

OTHER PUBLICATIONS

Contico Catalog, 1991–92.
Rubbermaid Automotive Products Catalog, ©1993 Rubbermaid Specialty Products, Inc., Wooster, Ohio.
Delta Consolidated Industries, Inc. Industrial Products 1994 Catalog.
Delta Consolidated Industries, Inc., Instruction Sheet, Replacement Parts List For Model No. 270000, 271000 (Black), & 272000, 275000 (Olive Drab Green) Dec. 1993.
Delta Consolidated Industries, Inc., Instruction Sheet, Replacement Parts List For Model No. 310000, 320000 Sep. 1993.
Delta Consolidated Industries, Inc., K'R Li'l LOCK'R Brochure.
Delta, Inc. of Arkansas, Fifth–Wheel Boxes Flyer.
Delta, Inc. of Arkansas, Packer Flyer.

*Primary Examiner*—Allan N. Shoap
*Assistant Examiner*—Nathan Newhouse
*Attorney, Agent, or Firm*—Renner, Kenner, Greive, Bobak, Taylor & Weber

[57] ABSTRACT

A container (20) suitable for use as a truck box for a pick-up truck, includes a base container portion (21) having an open top, and a cover (22) to close the open top. The cover (22) is pivotally attached to the base (21) by hinge mechanisms (23) which are uniquely formed by combining a hinge pin assembly (101) with a pin retaining assembly (102). The cover (22) may also be latched to the base (21) by a latch assembly (24) which includes pivotable handles (56, 57) on each end of the base (21) which, when either is pivoted, rotates latch hooks (68, 74) from a position engaging the cover (22) to a position releasing the cover, without moving the other handle. The container (20) may also receive a tray (150) therein positionable on a ledge (30) and positively located in one direction by ribs (159) and in the other direction by feet (162) positioned in depressions (38) formed between ribs (37) on the inside of the base (21). Divider plates (170) may also be positioned in those depressions (38) to divide the base (21) into compartments. The plates (170) are reinforced by one pattern of intersecting ribs (178) on one side and by a different pattern of intersecting ribs (179) on the other side.

34 Claims, 11 Drawing Sheets

U.S. PATENT DOCUMENTS

| | | | |
|---|---|---|---|
| 2,745,132 | 5/1956 | Clark et al. | 16/147 |
| 2,916,161 | 12/1995 | Schaefer | 206/512 X |
| 3,026,132 | 3/1962 | Korab et al. | 292/11 |
| 3,413,025 | 11/1968 | Sperry | 292/111 |
| 3,586,360 | 6/1971 | Perrotta | 292/26 |
| 3,640,423 | 2/1972 | Parker et al. | 220/31 R |
| 3,854,621 | 12/1974 | Parry | 220/20 |
| 3,940,009 | 2/1976 | Szeles | 220/20 |
| 4,204,724 | 5/1980 | Bauer et al. | 292/42 X |
| 4,213,539 | 7/1980 | Reuter | 220/333 |
| 4,273,368 | 6/1981 | Tanaka | 292/53 |
| 4,288,011 | 9/1981 | Grossman | 224/42.42 |
| 4,372,007 | 2/1983 | Lee | 16/260 |
| 4,456,141 | 6/1984 | Pamment | 220/326 X |
| 4,488,669 | 12/1984 | Waters | 224/273 |
| 4,499,998 | 2/1985 | Carlson | 206/541 |
| 4,531,774 | 7/1985 | Whatley | 296/37.6 |
| 4,593,816 | 6/1986 | Langenbeck | 206/425 |
| 4,674,665 | 6/1987 | Van Kirk | 224/273 |
| 4,728,017 | 3/1988 | Mullican | 224/42.42 |
| 4,770,330 | 9/1988 | Bonstead et al. | 224/42.42 |
| 4,848,626 | 7/1989 | Waters | 224/273 |
| 4,921,122 | 5/1990 | Bornstein et al. | 220/326 |
| 4,946,215 | 8/1990 | Taylor | 296/37.6 |
| 4,967,944 | 11/1990 | Waters | 224/273 |
| 4,998,425 | 3/1991 | Hoogland | 70/159 |
| 5,022,529 | 6/1991 | Kang | 220/343 X |
| 5,042,853 | 8/1991 | Gleason et al. | 292/126 |
| 5,080,250 | 1/1992 | Dickinson et al. | 220/335 |
| 5,088,636 | 2/1992 | Barajas | 224/281 |
| 5,094,375 | 3/1992 | Wright | 224/404 |
| 5,242,050 | 9/1993 | Billings | 206/373 X |
| 5,299,722 | 4/1994 | Cheney | 224/273 |
| 5,308,126 | 5/1994 | Weger, Jr. et al. | 292/53 |
| 5,484,092 | 1/1996 | Cheney | 224/404 |

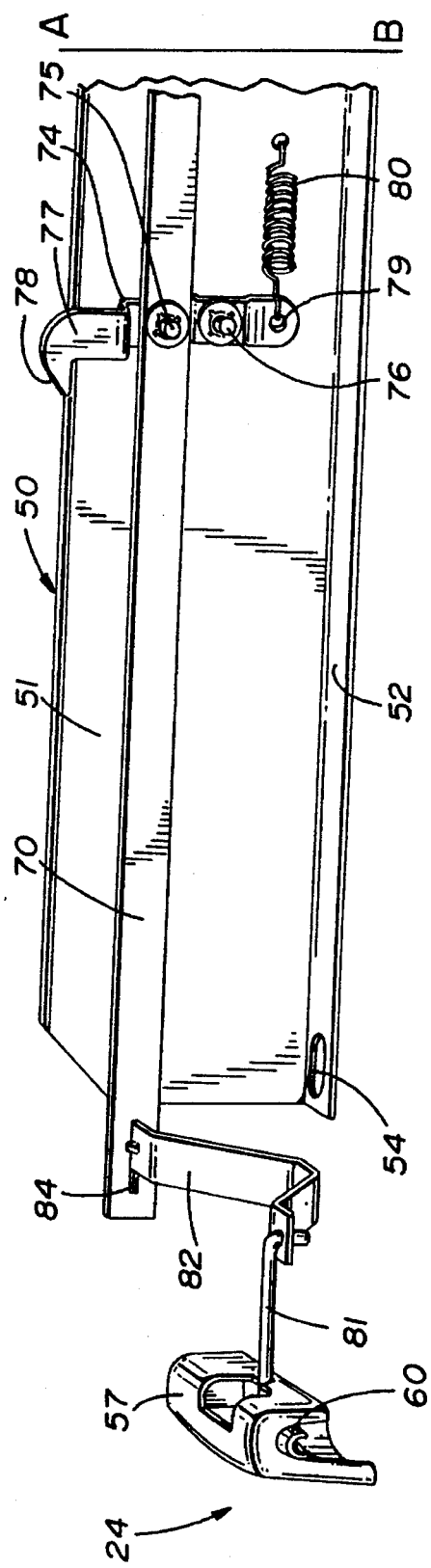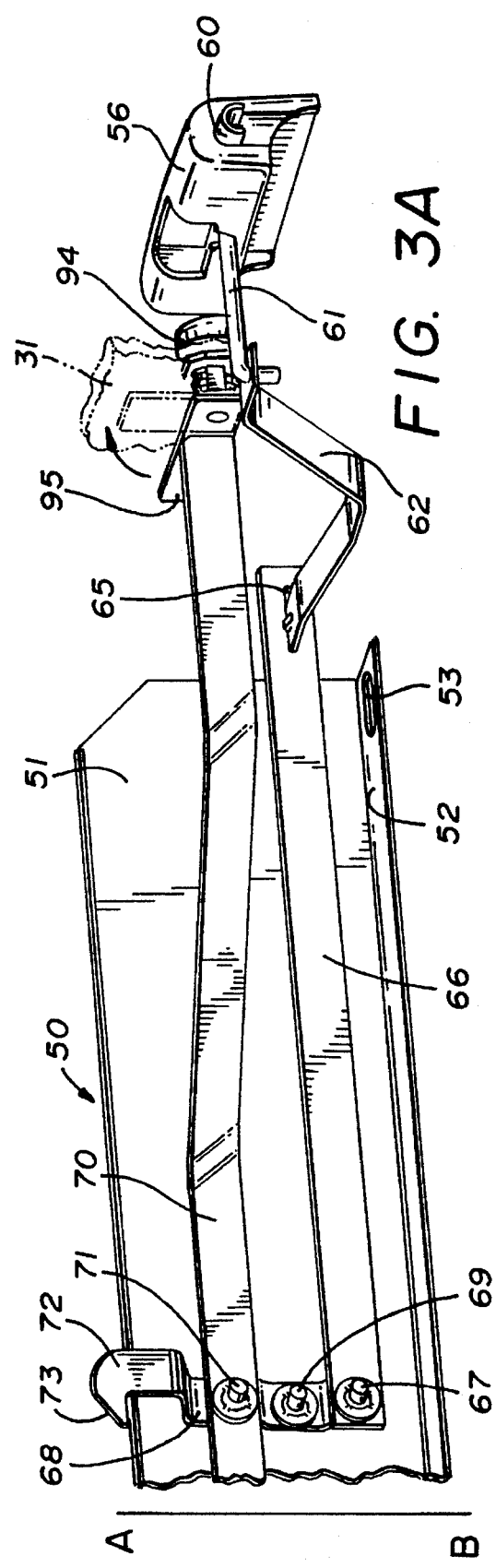

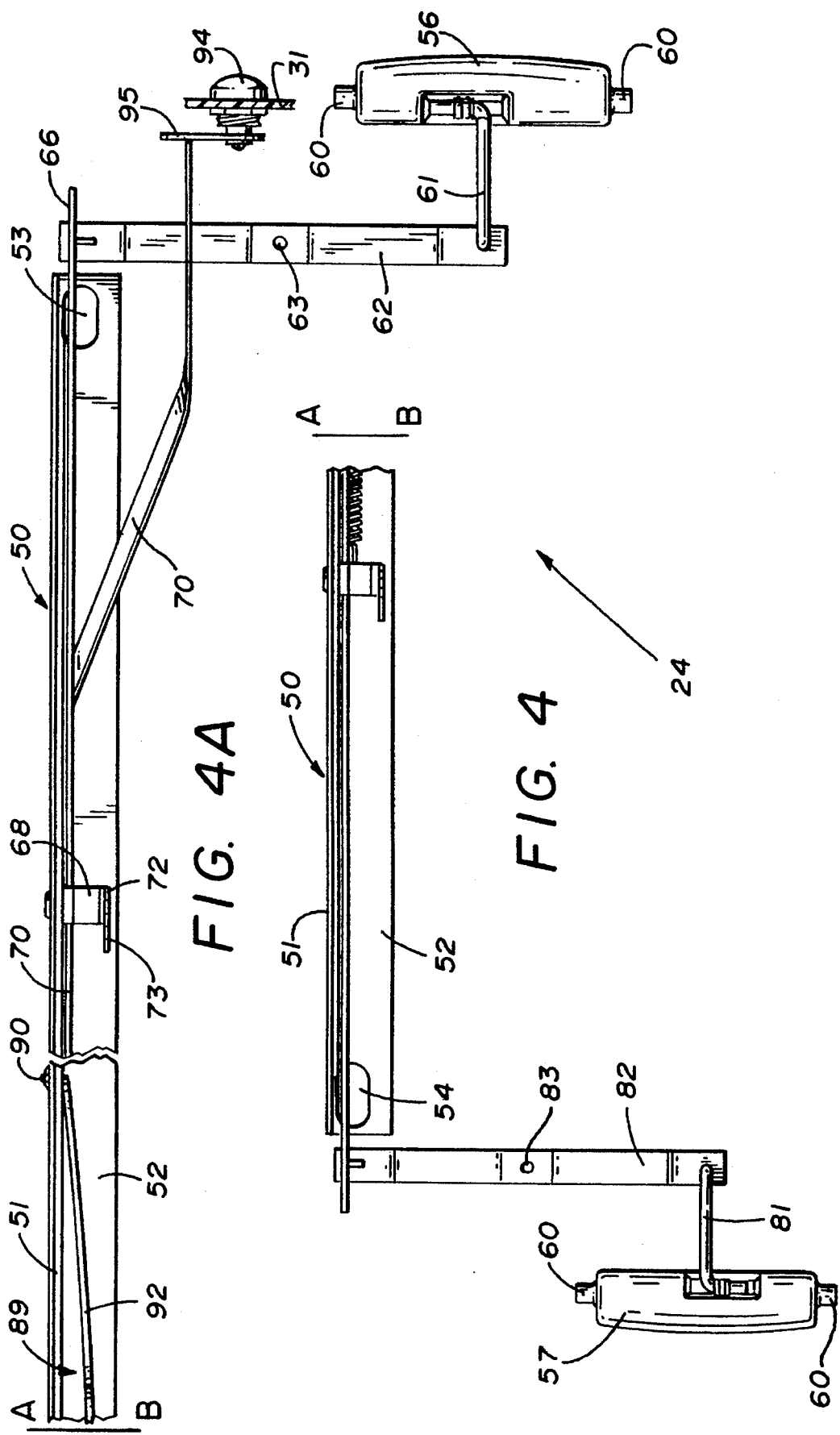

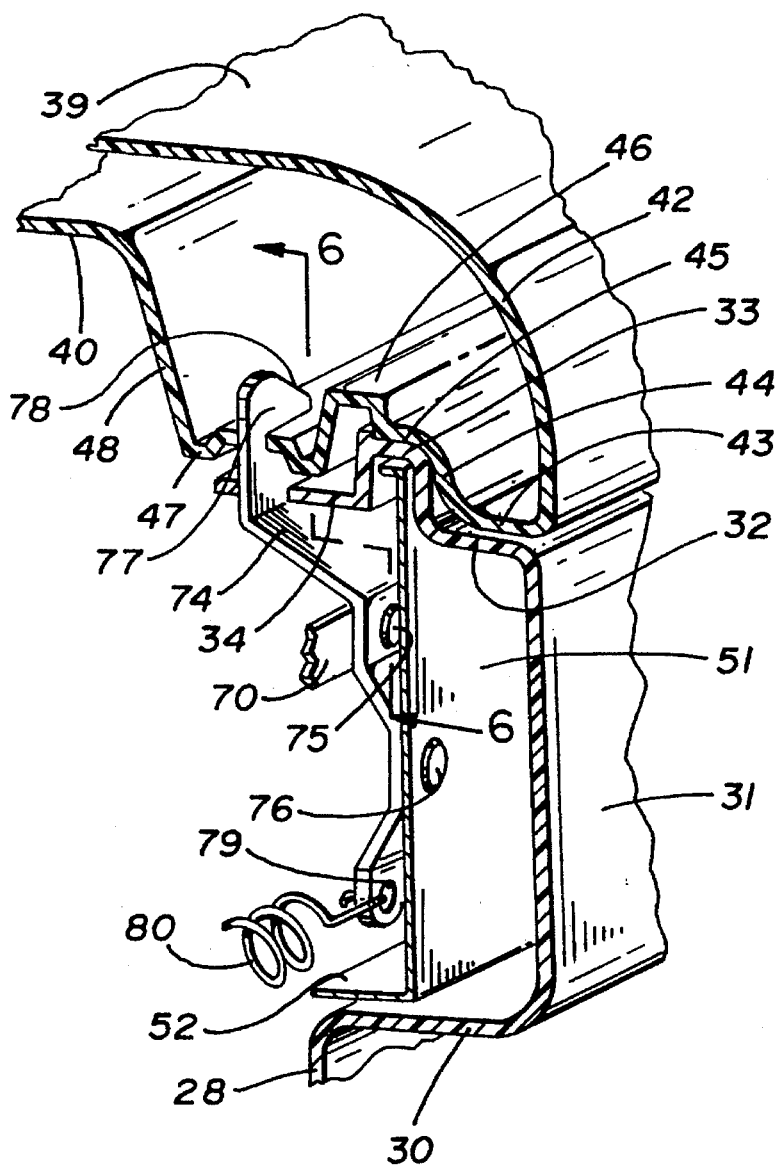
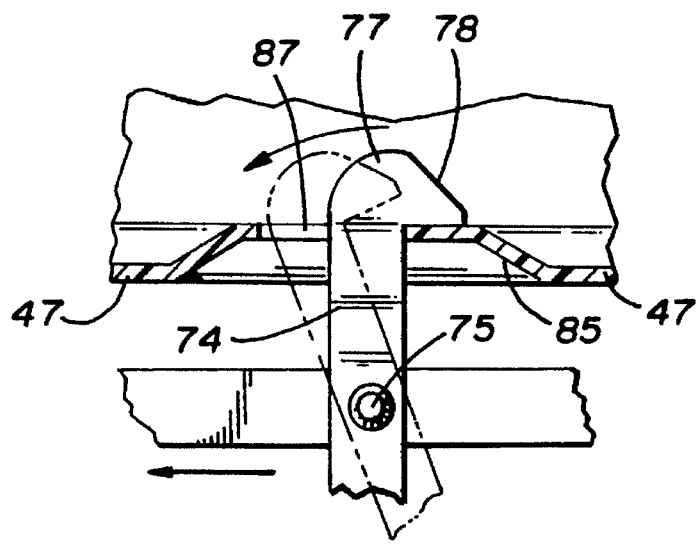
FIG 5
FIG. 6

TRUCK BOX

TECHNICAL FIELD

This invention relates to a storage container. More particularly, this invention relates to a storage container of the type which can be utilized and carried in the bed of a pickup truck. Specifically, this invention relates to the manner in which the cover of the truck box is hinged and latched to the base container portion as well as the manner in which items can be separately stored and organized within the base container.

BACKGROUND ART

It is known to provide open containers with covers hingedly attached thereto. For example, U.S. Pat. No. 4,488,669 discloses a truck box which is configured to be placed in the back of a pick-up truck or the like. The container has a body portion which is closed by two covers on either end thereof. A central portion is positioned between the two covers and not only extends from front to back but also extends between the ends of the box. Each of the two covers includes a mechanism for latching the hingedly affixed cover to the container body. The two covers are independently latchable to the container body.

U.S. Pat. No. 4,967,944 discloses a hinge mechanism wherein the cover of a truck box includes a hinge pin which is positioned through an aperture in the cover and also an aperture in the body of the container. Thus, the pin not only affixes the cover to the body of the container, but also serves as the hinge pin itself for the hinge mechanism.

A drawback with the container as described in the aforementioned patents is that each of two covers must be opened in order to gain access to the interior of the box and even then full access is still not obtained. Furthermore, each cover has a separate latch mechanism which must be manipulated, locked, and otherwise operated in order to secure the cover to the container body. Furthermore, with the hinge pin/connector of the '944 patent, it is necessary to provide surfaces on the cover and the container each sufficiently large and strong enough to carry apertures which are aligned and through which the hinge pin is placed. This increases the complexity of the container, which is a drawback with molded plastic containers.

Because of the drawbacks noted hereinabove with respect to truck boxes having multiple covers, some development work has been made with respect to boxes having a single cover which can be opened from either of the two ends of the box. For example, U.S. Pat. No. 5,308,126 discloses a complex push-button lock system for a container having a single cover. Each of the two lock mechanisms are interactively operable, such that pushing the button on one side of the box will cause two latches to be disengaged, thereby allowing the cover member to be removed from the container body. The complexity of the latch mechanism of the '126 patent will likely cause the operation of the latch mechanism to degrade over time. Because of the large number of interacting parts, and because each of these parts must work in particular unison, a misadjustment with respect to one of these members may cause the entire latch mechanism to fail.

Furthermore, in the latch mechanism as used in the '126 patent, the push buttons extend out beyond the outside of the container in order to allow a user to manipulate the buttons. This protrusion beyond the ends of the container, as depicted in the '126 patent, makes accidental delatching of the container cover a danger and also increases the possibility of the latch mechanism being damaged by impact of the button with the surrounding environment.

There has also been some development in the art with respect to providing means to permit the better organization of items positioned in the interior of such containers. For example, U.S. Pat. No. 4,848,626 discloses a container having a series of grooves such that a divider is receivable within two opposing grooves, thereby dividing the container interior so that items can be stored separately therein. The divider is required to be substantially less than the height of the container's upstanding sidewall. The '626 patent also discloses a secondary container which is positionable within the primary container body. The secondary container has a cover member and is held in place within the primary container body by interaction with grooves therein.

It is a primary drawback of the state of the prior art with respect to containers in general and truck boxes in particular, that the containers themselves, and the attendant latch, hinge, divider systems and secondary containers are somewhat complex in nature. There is an advantage to molding such containers from plastic materials, which advantage is severely limited when complex structures of such nature are required to be formed in the containers, or when complex and inefficient latch mechanisms must be fabricated. Furthermore, with respect to the latch mechanisms, it would be advantageous to form the latch mechanism from simple stamped parts, which are often not usable with very complex latch mechanisms that require precise and fined-tuned interaction.

It has also been found in the container art in general, and with truck boxes in particular, that such containers are often required to hold and support heavy tools or the like. Because of this, the strength of the box and its dividers is of utmost concern. It has been found that with previously known thermoformed plastic containers, that such strength, even with strengthening grooves and the like, is often difficult to obtain.

Therefore, a need exists for a container having a unitary hingedly affixed cover, which container is manufactured of a plastic material and which is sufficiently strong to hold and support heavy loads. Furthermore, the plastic container should offer maximum strength with a minimum of profiled surfaces or the like. The container should be provided with a latch mechanism which is operable from either end of the container, which latch mechanism does not protrude beyond the ends of the container, and which is capable of securely affixing the cover to the container in the closed position. The latch mechanism should be sufficiently strong to hold the cover to the container, and yet should be simple in configuration. The hinge mechanism should provide a secure means of hingedly affixing the cover to the container, and yet should not require interaction with large surface areas of the molded container itself in order to achieve this purpose. Further still, the container should readily accept a divider mechanism therein without the necessity for any additional support structure for the divider itself. The container should also readily accept a secondary container therein in a secure and selectively positionable manner.

DISCLOSURE OF THE INVENTION

It is thus an object of the present invention to provide a container, adapted to be carried in the back of a pickup truck, which has a single cover hingedly attached at one end to the container body and latched at the other end by a simple mechanism capable of being actuated at either end of the truck box.

It is another object of the present invention to provide a truck box, as above, with a simple but reliable hinge mechanism which utilizes the natural shrinkage of the container body, upon cooling after molding, to assemble the hinge mechanism.

It is a further object of the present invention to provide a truck box, as above, in which the latch mechanism is made out of simple, stamped parts, and which does not protrude from the outer profile of the container body.

It is an additional object of the present invention to provide a truck box, as above, in which items stored therein can be readily separated and organized by means of dividers which are simple, but sturdy, and which can be selectively positioned within the container without utilizing additional parts or creating additional design features of the container.

It is yet another object of the present invention to provide a truck box, as above, in which secondary containers, such as trays and the like, may be positioned at desired locations within the container without utilizing additional parts or creating additional design features of the container.

It is still another object of the present invention to provide a truck box, as above, in which the secondary containers may be positively positioned therein in one location and will not move upon vibration, centrifugal forces or the like, within the truck box.

These and other objects of the present invention, as well as the advantages thereof over known prior art forms, which will become apparent from the description to follow, are accomplished by the improvements hereinafter described and claimed.

In general, a container made in accordance with the present invention includes a base portion having a bottom surface, opposed front and rear walls extending upwardly from the bottom surface, and opposed end walls joined to the front and rear walls to form the base portion with an open top. A cover may be provided to close the open top and it may be selectively attached to the base portion by a latch assembly. The latch assembly includes first and second latch hooks each being pivotal on a pivot point from a position engaging the cover to a position releasing the cover. A first latch handle is pivotally received in one of the end walls and a second latch handle is pivotally received in the other end wall. The handles are connected to the latch hooks such that upon pivoting either one of the handles, the latch hooks will pivot to release the cover without moving the other handle.

In accordance with another aspect of the present invention, the cover is pivotally attached to the base portion by at least one hinge mechanism. Each hinge mechanism includes a hinge pin assembly carrying the cover and having a hinge pin. Each hinge mechanism also includes a retainer assembly having clip members adapted to receive the hinge pin. The retainer assembly also includes means which can be pivoted to hold the hinge pin within the clip members so that the hinge pin can rotate in the clip members. The retainer assembly is received in a pocket formed near the top of the rear wall of the base portion so that the cover can pivot with respect to the base portion on the hinge pin.

The container is thus assembled by placing the pin into the pin retainer so that it is rotatable relative to the retainer. The plastic container is then molded with the pocket formed therein. While it is still warm from the molding process, the retainer is placed in the pocket such that when the container cools, it shrinks to engage the retainer. Thereafter, the cover can be attached to the hinge pin assembly so that it can pivot to open and close the open top of the base portion.

When the container of the present invention is adapted to be utilized with an internal tray, a generally horizontal ledge may be formed inside of the container around the periphery of and near the open top. The tray has a bottom surface and opposed side walls and end walls extending upwardly therefrom, and a plurality of ribs depending downwardly from the bottom surface and extending generally parallel to one set of the opposed walls. The ribs, however, terminate at their ends short of the other set of opposed walls so that the periphery of the bottom surface at the other set of opposed walls can rest on the container ledge. The ends of the ribs are thereby positioned below and adjacent to the ledge to prevent significant movement of the tray in a direction parallel to the one set of opposed tray walls.

In accordance with another feature of the present invention, the inside of the front and rear walls of the container base portion have aligned ribs formed therein with aligned recesses formed between adjacent of these ribs. The bottom of the tray may be provided with means to be received in selected of the recesses to locate the tray in the container and prevent it from moving in the other direction, that is, in the direction of the base container end walls.

The ribs and recesses in the front and rear walls may also be used to assist in dividing the base portion of the container as desired in accordance with yet another aspect of the present invention. Opposed recesses may receive a means to divide the container in the form of a plate-like structure being reinforced by a first pattern of reinforcing ribs on one side and a second, different pattern of reinforcing ribs on the other side thereof.

A preferred exemplary truck box incorporating all of these concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIGS. 3 and 3A are figures joined at line AB and together are a fragmented elevational view of the latch mechanism for the truck box looking from the inside of the truck box toward the front thereof.

FIGS. 4 and 4A are figures joined at line AB and together are a fragmented top plan view of the latch mechanism shown in FIGS. 3 and 3A.

FIG. 5 is a partially sectioned, fragmented perspective view showing some of the details of the latch mechanism shown in FIGS. 3, 3A, 4 and 4A.

FIG. 6 is a sectional view taken substantially along line 6—6 of FIG. 5.

PREFERRED EMBODIMENT FOR CARRYING OUT THE INVENTION

Figure 1:
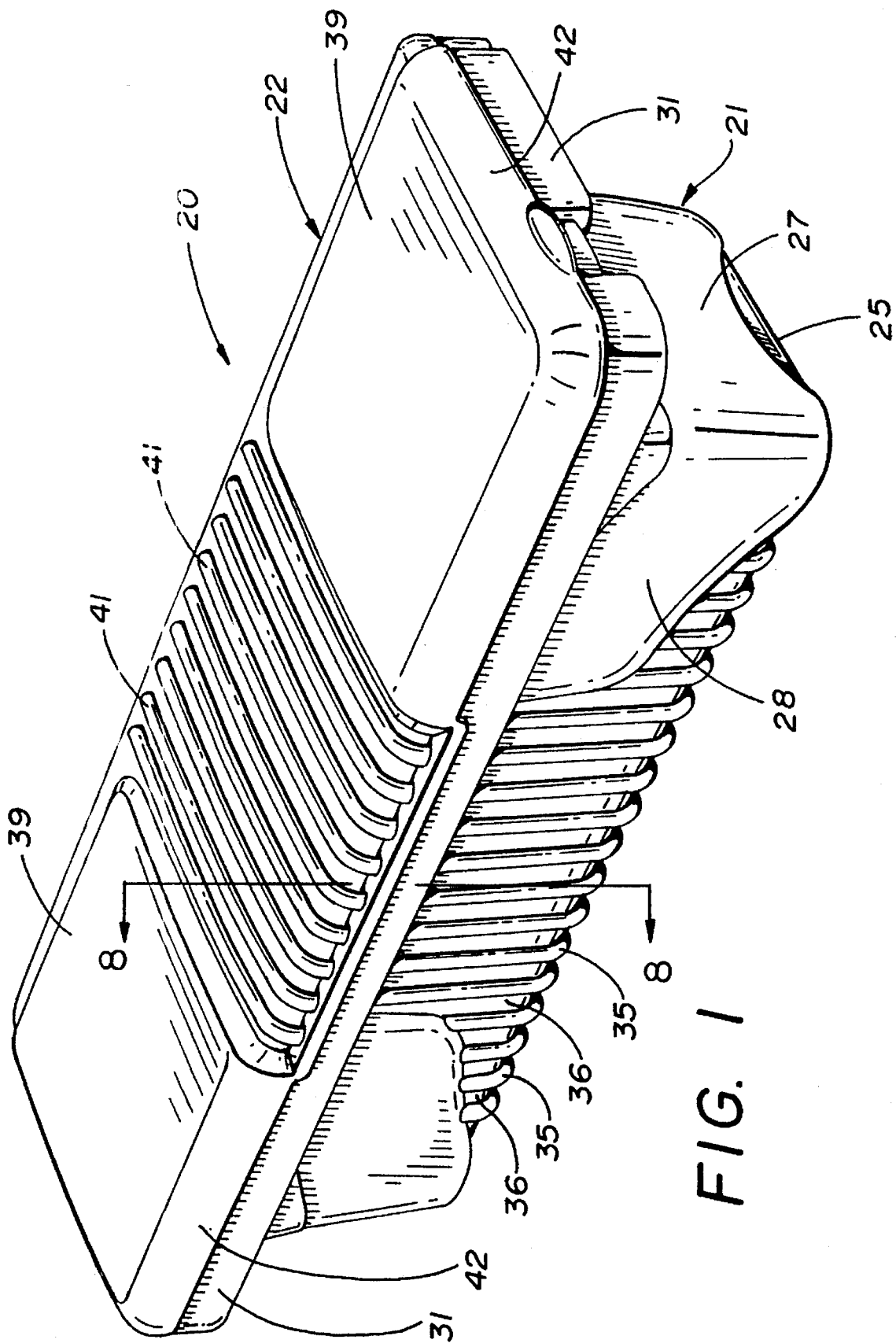
FIG. 1 is a perspective view of a truck box made in accordance with the concepts of the present invention.

A container suitable for use as a truck box to be positioned in the back of a pickup truck, and made in accordance with the concepts of the present invention, is indicated generally by the numeral 20. Truck box 20 includes a base container portion, generally indicated by the number 21, and a cover, generally indicated by the number 22, to selectively open and close the open top of base container 21. Cover 22 is pivotally attached to container 21 by hinge mechanisms generally indicated by the numeral 23 and best shown in FIGS. 9–11. The side of cover 22 opposed to that carrying hinge mechanisms 23 can be connected to container 21 by a latch assembly generally indicated by the numeral 24 and best shown in FIGS. 3–8. The base container 21 and cover 22 are preferably formed of a moldable grade of high density polyolefin resin.

Base container 21 includes a bottom surface 25, opposed end walls 26, 27 extending generally vertically upwardly from bottom surface 25, and a front wall 28 and opposed back wall 29 also extending generally vertically upwardly from bottom surface 25. End walls 26 and 27 join with front wall 28 and back wall 29 at corners to form the storage area for container 21.

A generally horizontal ledge 30 extends laterally outwardly from the top of walls 26, 27, 28 and 29 and terminates as an upstanding generally vertical skirt 31, the top of which defines the rim or open top of container 21. The configuration of that rim is probably best shown in FIG. 5. A horizontal ledge 32 extends inwardly from the upper end of skirt 31 then turns upwardly at one branch of an inverted U-shaped rim 33 and then a second horizontal ledge 34 extends inwardly from the other branch of U-shaped rim 33. The portions of ledge 30 which overhang end walls 26 and 27 are intended to rest on top of the side rails of the bed of a pickup truck such that truck box 20 is basically suspended within the truck bed with its front wall 28 facing the rear of the truck.

A plurality of outwardly protruding ribs 35 are formed on at least a portion of front wall 28 and, as one of their functions, provide structural strength to container 21. Ribs 35 continue and are formed across bottom surface 25 as well and also continue upwardly on back wall 29. Depressions 36 are formed between adjacent outer ribs 35. However, outer depressions 36 form corresponding inner ribs 37 on the inside of front wall 28 and back wall 29 and outer ribs 35 form inner depressions 38 on the inside of front wall 28 and back wall 29.

Figure 2:
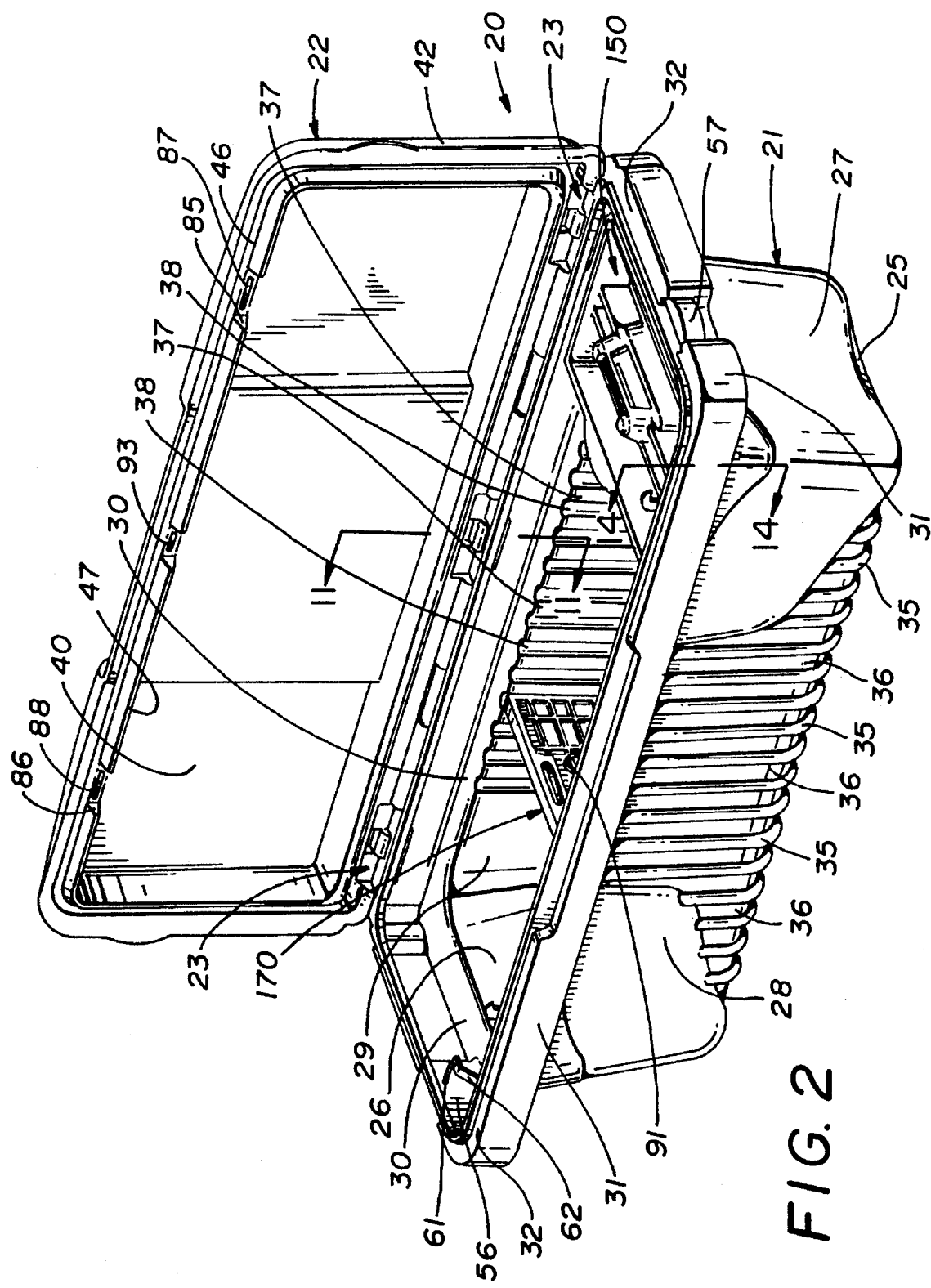
FIG. 2 is a perspective view of the truck box of FIG. 1 with its cover in an open position.

Cover 22, as shown in FIG. 5, is preferably a double-walled structure having an upper wall 39 (FIG. 1) and a generally parallel, spaced lower wall 40 (FIG. 2). As shown in FIG. 1, upper wall 39 may be provided with some strengthening ribs 41 similar to ribs 35 of base container 21. However, as shown in FIG. 2, ribs do not have to appear, but could be utilized in lower wall 40. A downturned arcuate skirt 42 is provided at the entire periphery of cover upper wall 39.

Figure 8:
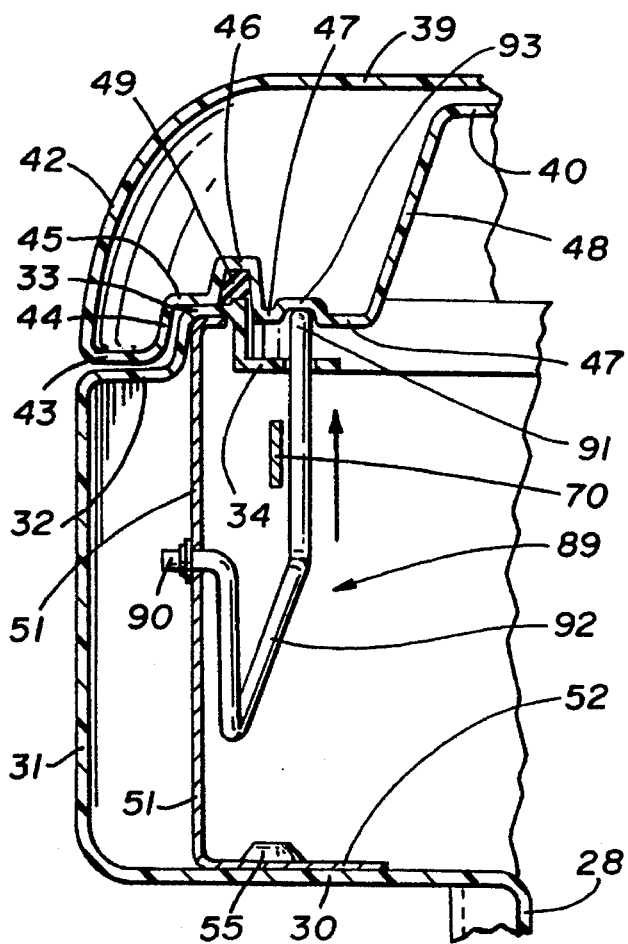
FIG. 8 is a fragmented sectional view taken substantially along line 8—8 of FIG. 1.

The connection between upper wall 39 and lower wall 40 can be seen in figures such as FIGS. 5 or 8. Skirt 42 turns inwardly to form a cover lip 43 which rests on ledge 32 of base container 21 when cover 22 is closed thereon. Lip 43 then turns upwardly, as at 44, and then horizontally to form an upper lip 45 which rests on top of the U-shaped rim 33 of base container 21. The inner edge of upper lip 45 is integrally connected to a branch of an inverted U-shaped socket 46. The other branch of socket 46 is integrally connected to a ledge 47 which terminates at a downturned portion 48 of lower wall 40. A sealing gasket 49 (FIG. 8) may be positioned in socket 46 to seal the contents of truck box 20 from the environment when cover 22 is latched to container 21 by latch assembly 24 now to be described in detail.

Latch assembly 24 is for the most part formed from stamped metal parts and, as best shown in FIGS. 3 and 4, it includes an L-shaped support bracket generally indicated by the numeral 50. Bracket 50 extends generally the entire length of truck box 20 and is positioned just inside of skirt 31 of front wall 28 as viewed in FIG. 2. Bracket 50 includes a long upstanding branch 51 which extends between ledge 30 and rim 33 (FIG. 5), and a short, generally horizontally extending, branch 52 which is mounted on ledge 30 of base container 21. The connection between branch 52 and ledge 30 is accomplished by slots 53 and 54 which are cut into branch 52. A lug 55 formed on ledge 30 (shown from the bottom in FIG. 7) is received in slot 53 while the base container 21 is still hot as it comes out of its mold. Upon cooling, shrinkage occurs and together, with another lug (not shown) positioned in slot 54, bracket 50 is tightly gripped and thereby mounted on ledge 30. In addition, branch 51 is held tightly between ledge 30 and U-shaped rim 33, as shown in FIG. 8, as the shrinkage occurs because rim 33 will bear tightly against the flat top of branch 51.

Latch assembly 24 also includes two latch handles 56, 57 located on both sides of truck box 20 and preferably formed of a polypropylene plastic material. Thus, latch handle 56 is recessed within a pocket 58 (FIG. 7) formed in skirt 31 above end wall 26 on the driver's side of truck box 20 when positioned in a pickup truck, and latch handle 57 is recessed within a pocket 59 formed on skirt 31 above end wall 27 on the passenger's side of the truck box. Handles 56 and 57 are each provided with pins 60 extending laterally outwardly therefrom which are received within slots which extend into pockets 58 and 59. Thus, handles 56 and 57 are pivotable within pockets 58 and 59, respectively, as pins 60 rotate within the slots.

Figure 7:
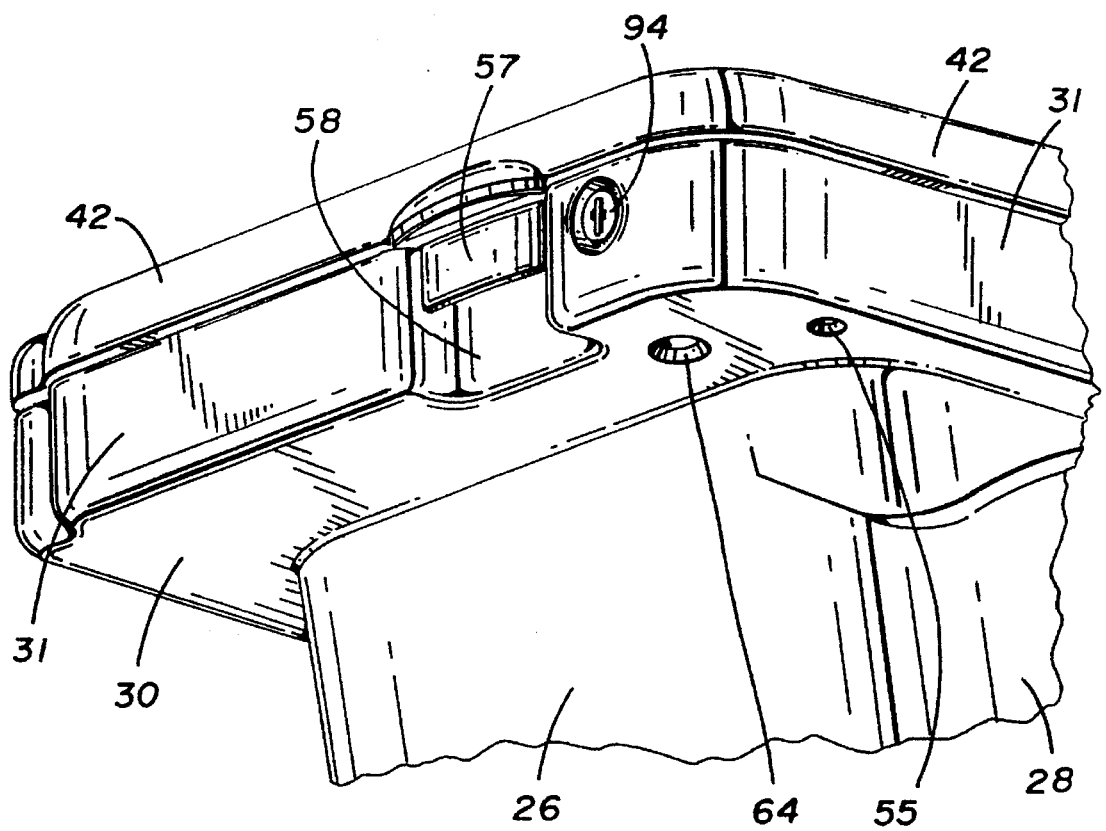
FIG. 7 is a fragmented perspective view of a portion of the end of the truck box not visible in FIG. 1.

Handle 56 is connected to a Z-pin 61 such that when lifted and pivoted, handle 56 pulls Z-pin 61 to the right as viewed in FIGS. 3A and 4A. Z-pin 61 is connected at its other end to one end of a scissor link 62, the medial portion of which is provided with an aperture 63 to receive a fastener therethrough to pivotally attach scissor link 62 to ledge 30 of base container 21. As shown in FIG. 7, ledge 30 can be provided with a thickened area 64, similar to lug 55, to securely receive the fastener. However, the connection is such that when handle 56 is pivoted, Z-pin 61 pulls scissor link 62 to rotate it about the point of the fastening, that is, about aperture 63 in a counterclockwise direction as viewed in FIG. 4A.

The other end of scissor link 62 is slidably received in a slot 65 formed in one end of a drawbar 66. The rotation of scissor link 62, as just described, pushes drawbar 66 to the left as viewed in FIG. 3A and 4A. The other end of drawbar 66 is fixedly attached, as at 67, to the bottom of a latch member 68. Latch member 68 is pivotally attached to upstanding branch 51 of bracket 50, at point 69. Above point 69, and therefore on the opposite side of point 69 from attachment point 67, an elongate drawbar 70 is attached, as at 71, to latch member 68. Thus, when drawbar 66 is pushed to the left as viewed in FIGS. 3A and 4A, as previously described, latch member 68 rotates clockwise, as seen in FIG. 3A, about point 69. Thus, as will be discussed hereinafter in more detail, the top of latch member 68, which is formed as a hook 72 having a top bevelled surface 73, is rotated clockwise.

Such motion, of course, moves elongate drawbar 70 to the right as viewed in FIGS. 3A and 4A. Because drawbar 70 is also fixedly attached to a second latch member 74, as at 75, like latch member 68, it is rotated in a clockwise direction, as viewed in FIG. 3, about it pivot connection 76 to branch 51 of bracket 50. Such causes the top hook portion 77 of latch member 74, which also has an upper bevelled surface 78, like hook 72, to rotate clockwise. The bottom of latch member 74, that is, the side of pivot point 76 opposite to the connection 75 of drawbar 70, is provided with an eyelet 79 which is engaged by one end of a coil spring 80 whose other end is connected to branch 51 of bracket 50. As such, when handle 56 is released, latch hooks 72 and 77 are returned to the position shown in FIGS. 3 and 3A under the influence of the bias of spring 80.

Passenger side handle 57 is likewise connected to a Z-pin 81 such that when lifted and pivoted, handle 57 pulls Z-pin 81 to the left, as viewed in FIGS. 3 and 4. Z-pin 81 is connected at its other end to one end of another scissor link 82, the medial portion of which is provided with an aperture 83 to receive a fastener therethrough to pivotally attach scissor link 82 to ledge 30 of base container 21 in the same manner that scissor link 62 is so attached, as previously described. The other end of scissor link 82 is slidably received in a slot 84 formed near the end of drawbar 70 adjacent to handle 57. When handle 57 is pivoted, Z-pin 81 pulls scissor link 82 to rotate it about the fastening point defined by aperture 83 in a clockwise direction as viewed in FIG. 4. This pushes drawbar 70 to the right, as viewed in FIGS. 3 and 4, and because drawbar 70 is fixed to latches 68 and 74 above their pivot points 69 and 76, respectively, hooks 72 and 77 will pivot in the same manner that they pivoted when handle 56 was lifted to release cover 22. Thus, the latch mechanism 24 is operable from either side of truck box 20.

It should be noted that because slot 65 in drawbar 66 and slot 84 in drawbar 70 are larger than and slidably receive the ends of scissor links 62 and 82, respectively, there is a lost motion effect and one handle 56, 57 is not affected when the other handle 56, 57 is being manipulated. Thus, because the ends scissor links 62 and 82 are normally adjacent the inner of facing ends of slots 65 and 84, respectively, when handle 56 is lifted, scissor link 62 immediately bears on drawbar 66 to move it and drawbar 70 as previously described, but as drawbar 70 moves to the right, as viewed in FIG. 3, scissor link 82 does not move because drawbar 70 is moving with respect to scissor link 82 with the net effect being that the outer end of slot 84 is then adjacent to scissor link 82 which has not moved. Conversely, when handle 57 is lifted, scissor link 82 immediately bears on drawbar 70 to move it and drawbar 66 as previously described, but as drawbar 66 moves to the left, as viewed in FIG. 3A, scissor link 62 does not move because drawbar 66 is moving with respect to scissor link 62 with the net effect being that the outer end of slot 65 is then adjacent to scissor link 62 which has not moved. Thus, neither handle 56, 57 will move or react when the other is being pivoted. Moreover, since handles 56 and 57 are recessed, they cannot easily be accidentally manipulated.

The manner in which latch members 68 and 74, when so operated, act to engage cover 22 will now be described. As best shown in FIGS. 2 and 6, cover ledge 47 is interrupted or recessed at two locations 85 and 86, and slots 87 and 88 are formed at those recessed locations 85 and 86, respectively. Thus, as shown in FIG. 6 with respect to latch member 74, when it is pivoted as previously described, it rotates within slot 87 as shown to disengage cover 22 where it had previously been engaged in the area of recess 85. Although not shown, latch member 68 does the same thing in slot 88 of recess 86.

When the cover 22 is so released, a wire, sear-like and somewhat W-shaped spring 89 (FIGS. 4A and 8) pushes cover 22 away from base portion 21 in a manner now to be described. The ends 90 of spring 89 are fixed to branch 51 of bracket 50 generally centrally thereof and thus centrally of truck box 20. At the center of spring 89, its top loop 91 is urged upwardly by the flexing nature of the spring steel rod 92 formed between each spring end 90 and top loop 91. When cover 22 is closed on base container 21, loop 91 is biased against a central recess 93 formed in cover ledge 47 (FIGS. 2 and 8). Loop 91 passes through an aperture in ledge 34 (FIG. 8) which assists in keeping spring 89 from bending. When latch assembly 24 is activated to release cover 22, spring 89 will urge cover 22 away from base container 21 so that cover 22 can be thereafter manually lifted to the FIG. 2 position. Upon the closing of cover 22, loop 91 is engaged by cover 22 at the area of recess 93 and rods 92 will flex. In addition, cover portions 85 and 86 will bear against bevelled surfaces 73 and 78 of hooks 72 and 77, respectively, causing them to pivot within slots 87 and 88 until they snap into the engaging position.

Cover 22 may be locked onto container portion 21 so that latch assembly 24 may not be operated. To that end, a conventional key-operated cam lock 94 may be most conveniently positioned on the driver's side of truck box 20 such as in and through skirt 31 (FIG. 7). As is well known in the art and as shown in FIGS. 3A and 4A, lock 94 includes a rotatable stop plate 95 which is turned from a locked position, shown in solid lines in FIGS. 3A and 4A, to the unlocked, chain line position shown in FIG. 3A. When in the locked position, plate 95 prohibits drawbar 70 from moving such that handles 56 and 57 cannot be lifted to unlatch cover 22 from base portion 21.

Figure 9:
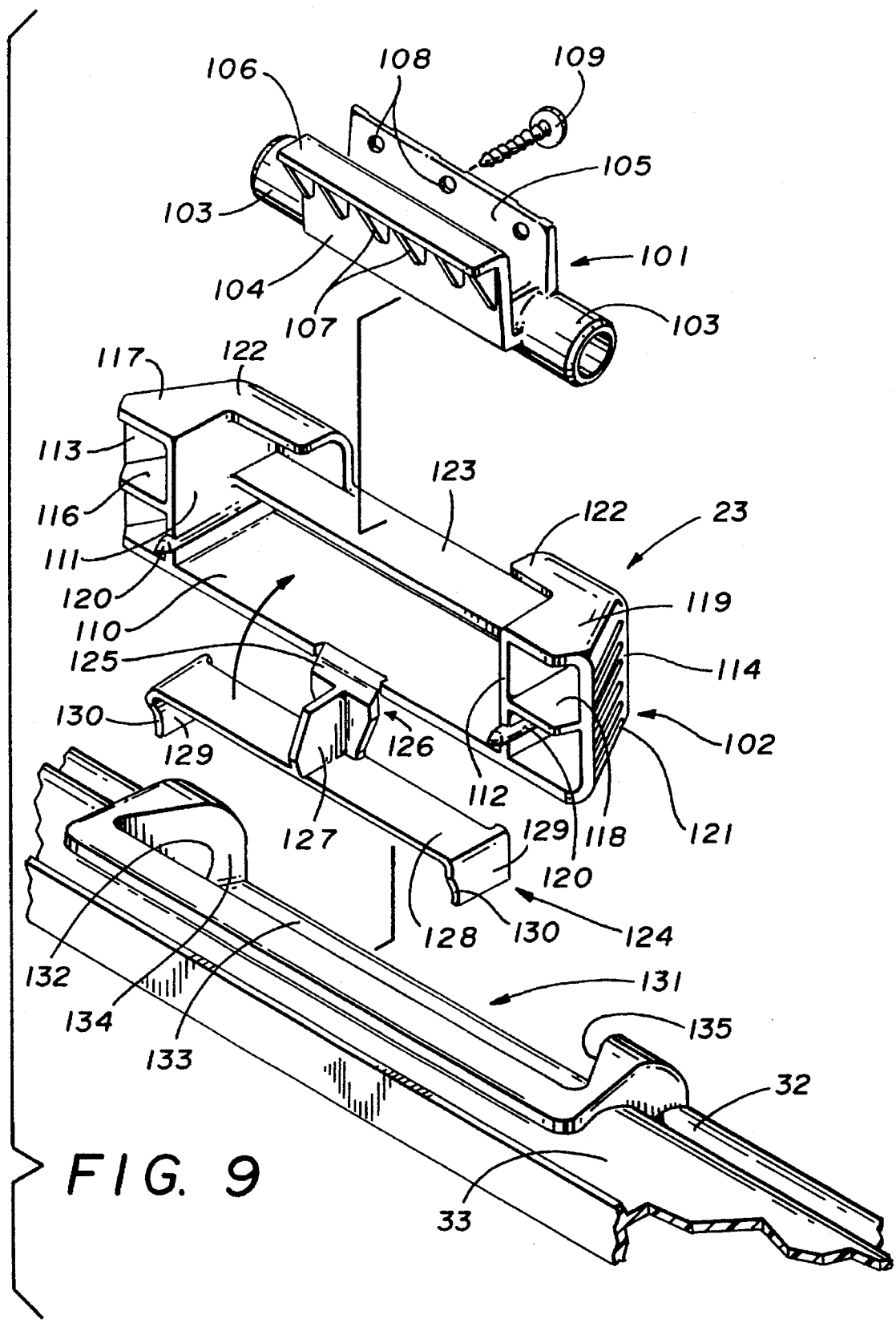
FIG. 9 is a fragmented, exploded perspective view of the components of the hinge mechanism for the truck box and the portion of the base of the truck box into which the hinge mechanism is inserted.
Figure 10:
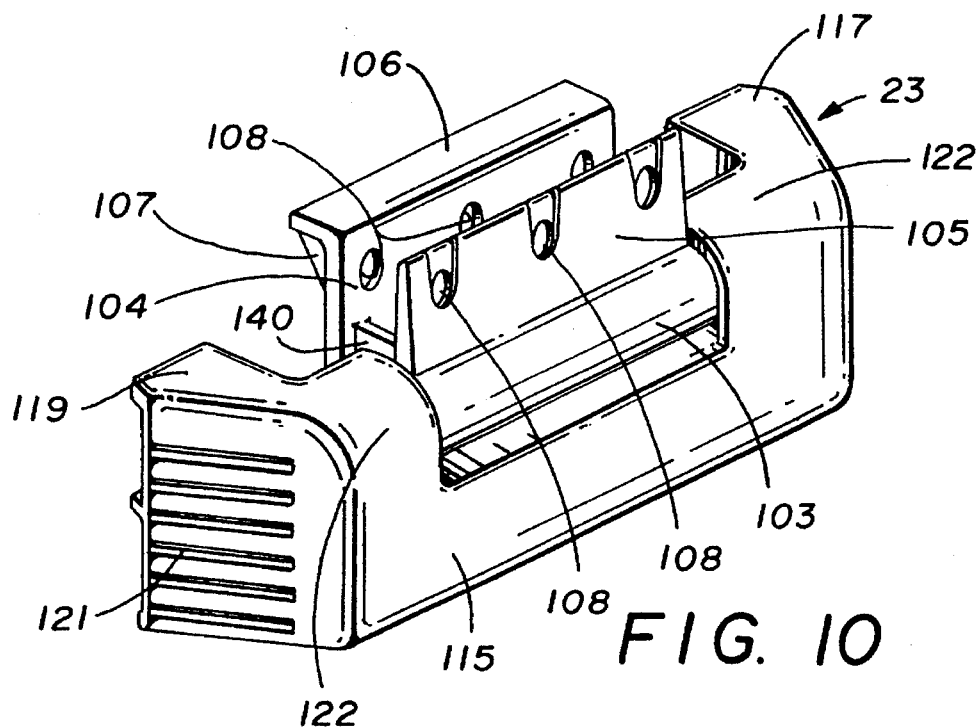
FIG. 10 is a perspective view of the components of the hinge mechanism after it is assembled.
Figure 11:
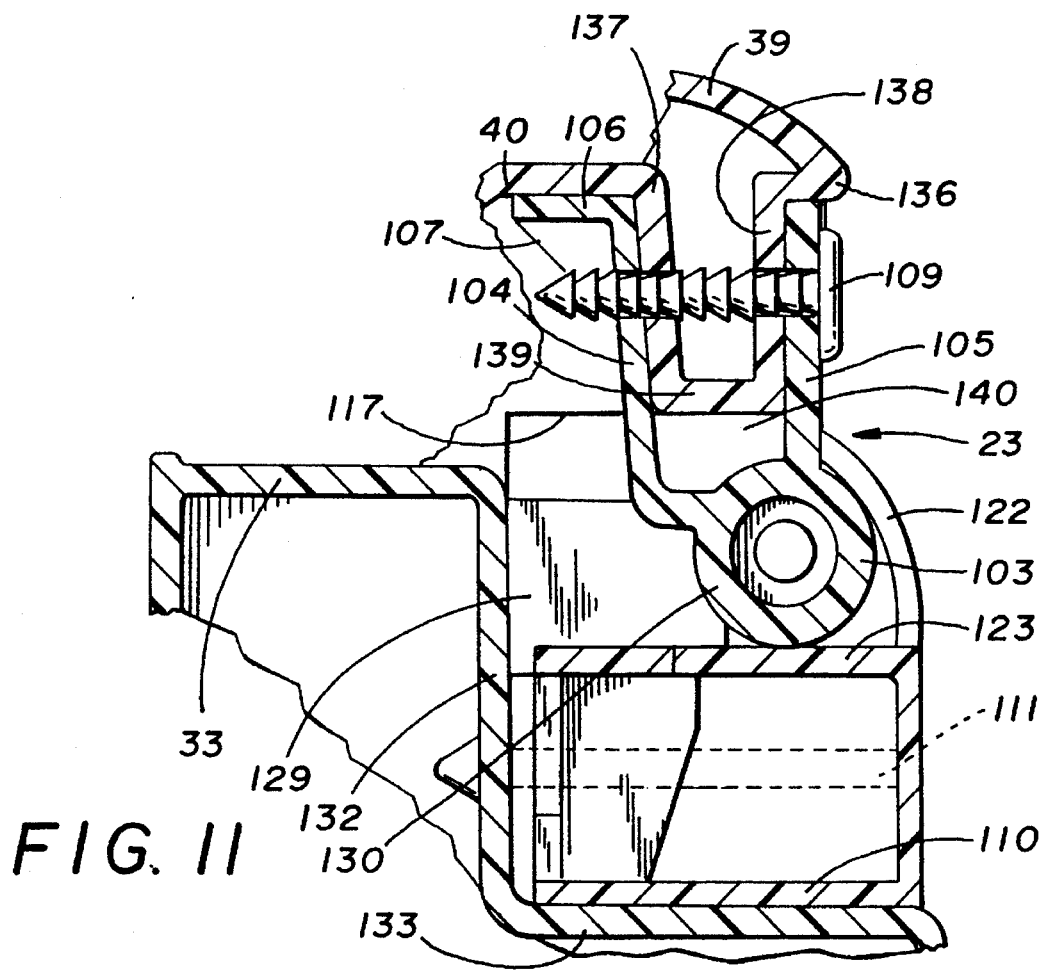
FIG. 11 is a sectional view of a hinge mechanism in the truck box taken substantially along line 11—11 of FIG. 2.

As previously indicated, cover 22 is attached to base portion 21 at the top of back wall 29 by hinge mechanisms 23 best shown in FIGS. 9–11 and now to be described in detail. As shown in FIG. 2, there are preferably three hinge mechanisms 23, but it should be evident that any number of such mechanisms could be provided dependent, primarily, on the size of truck box 20 and the concomitant hinge strength required. While one hinge mechanism 23 will be discussed, it is to be understood that all hinge mechanisms 23 which are provided are preferably identical and molded of a high density polyolefin resin material.

Each hinge mechanism includes 23 a hinge pin assembly generally indicated by the numeral 101 and pin retaining assembly generally indicated by the numeral 102. Hinge pin assembly 101 includes an elongate pivot pin 103 having spaced wing plates 104, 105 extending outward therefrom in planes generally perpendicular to the longitudinal plane at pin 103. At least wing plate 104 can be provided with an upper, generally horizontal, flange 106 and plate 104, as well as plate 105, if desired or necessary, may be reinforced by gussets 107, for example, shown extending between plate 104 and flange 106. Wing plates 104 and 105 are not of the same longitudinal length of pin 103 and, as shown, are shorter than, and intermediate of the ends of, pin 103 to leave the ends thereof exposed as shown in FIG. 9. Both wing plates are provided with aligned apertures 108 to receive, as will hereinafter be described, conventional "christmas tree" fasteners 109 therethrough.

Retaining assembly 102 includes a longitudinally-extending base plate 110 having inner end walls 111, 112 and outer end walls 113, 114 extending upwardly therefrom. As shown in FIG. 9, walls 111 and 112 are not parallel to walls 113 and 114. As such, wall 111 is spaced from wall 113 and wall 112 is spaced from wall 114 at their front ends, as viewed in FIG. 9, further than where they intersect back wall 115. The space between wall 111 and wall 113 can be reinforced by a shelf 116 and is closed at the top by a ledge 117. Similarly, the space between wall 112 and wall 114 can be reinforced by a shelf 118 and is closed at the top by a ledge 119. Inner end walls 111, 112 may each be provided with spike members 120 and the outer side of outer end walls 113, 114 may be provided with ribbing 121, the purpose of which will be hereinafter described.

Arcuate clip members 122 are formed between back wall 115 and ledges 117 and 119 and extend laterally further inwardly between walls 111 and 112. The exposed ends of pin 103 (FIG. 9) of hinge pin assembly 101 are received by clip members 122 above a ledge 123 that extends laterally between walls 111 and 112. Assembly 101 is thus pivotable with respect to retaining assembly 102 as pin 103 is rotatable in the space between clip members 122 and ledge 123.

Pin 103 is maintained radially within that space by a pivotal retainer assembly generally indicated by the numeral 124. Retainer 124 is pivotally attached to base plate 110 by a living hinge 125 formed therebetween. Hinge 125 carries a T-shaped plate 126, the base branch 127 of which carries the elongate base portion 128 of a U-shaped plate having side branches 129. One side of each side branch 129 is provided with a radiused surface 130. When pin 103 is in place between clip members 122 and ledge 123, rotation of retainer 124 on its hinge 125 in the direction of the arrow in FIG. 9 causes side branches 129 to engage the exposed end areas of pin 103 at the point of radiused surfaces 130, the radius of which preferably matches the arc of the circumference of pin 103.

A pocket 131 is formed at the top of skirt 31 of back wall 29 for each hinge mechanism 23. The overall profile of pocket 131 is designed to match the outer profile of retainer 102. As such, each pocket 131 has a front wall 132, a bottom wall 133 adapted to receive base plate 110 of retaining member 102, and side walls 134, 135 positioned at an angle matching that of retainer walls 113 and 114, respectively. When base 21 comes out of its manufacturing mold and is still hot, an assembled hinge mechanism 23, such as shown in FIG. 10, is placed in pocket 131. As the base 21 naturally cools, shrinkage occurs and the hinge mechanism is firmly maintained in pocket 131. Spike members 120 assist in assuring this connection in that the shrinking drives them into pocket wall 132 as shown in FIG. 11. Moreover, ribbing 121 firmly engages pocket walls 134, 135.

Hinge mechanism 23 may then receive cover 22 as shown in FIG. 11. Lower cover wall 40 is adapted to rest on flange 106 of wing plate 104 of hinge pin assembly 101 and upper cover wall 39 is formed with a lip 136 that rests upon wing plate 105. Cover walls 39 and 40 are joined by a U-shaped section having upstanding branches 137, 138 joined by a lower base member 139. Branch 137 is positioned adjacent to wing plate 104, branch 138 is positioned adjacent to wing plate 105, and base member 139 is adapted to rest on ribs 140 positioned between wing plates 104 and 105. Fasteners 109 may then pass through and engage wing plates 104 and 105 as well as passing through and engaging apertures in branches 137 and 138 to complete the assembly of hinge mechanism 23. Cover 22 can thus be pivoted with respect to base portion 21 as pin 103 rotates relative to pin retainer 102.

Figure 12:
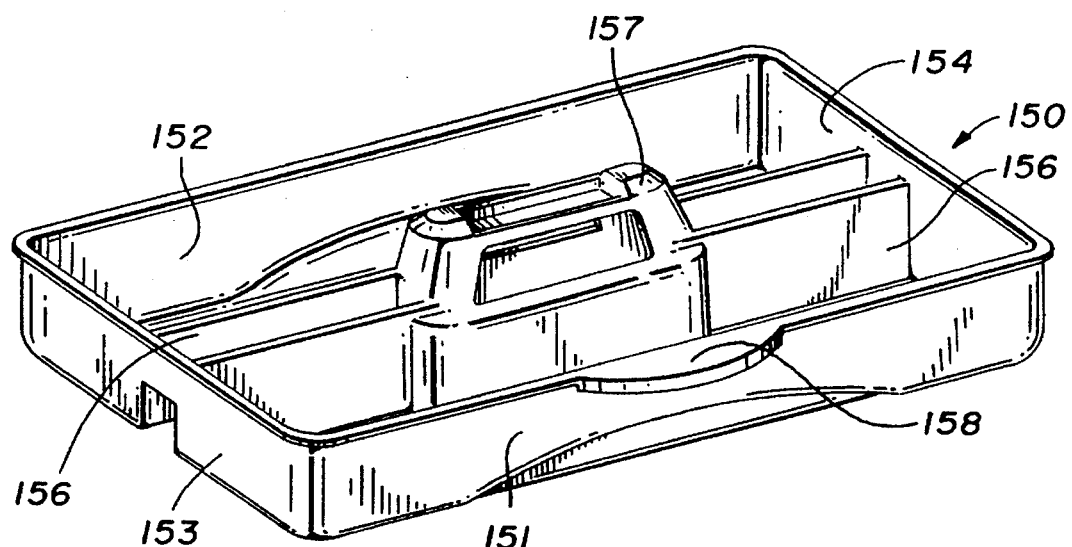
FIG. 12 is a perspective view of a tray which is shown in FIG. 2 positioned in the truck box.
Figure 13:
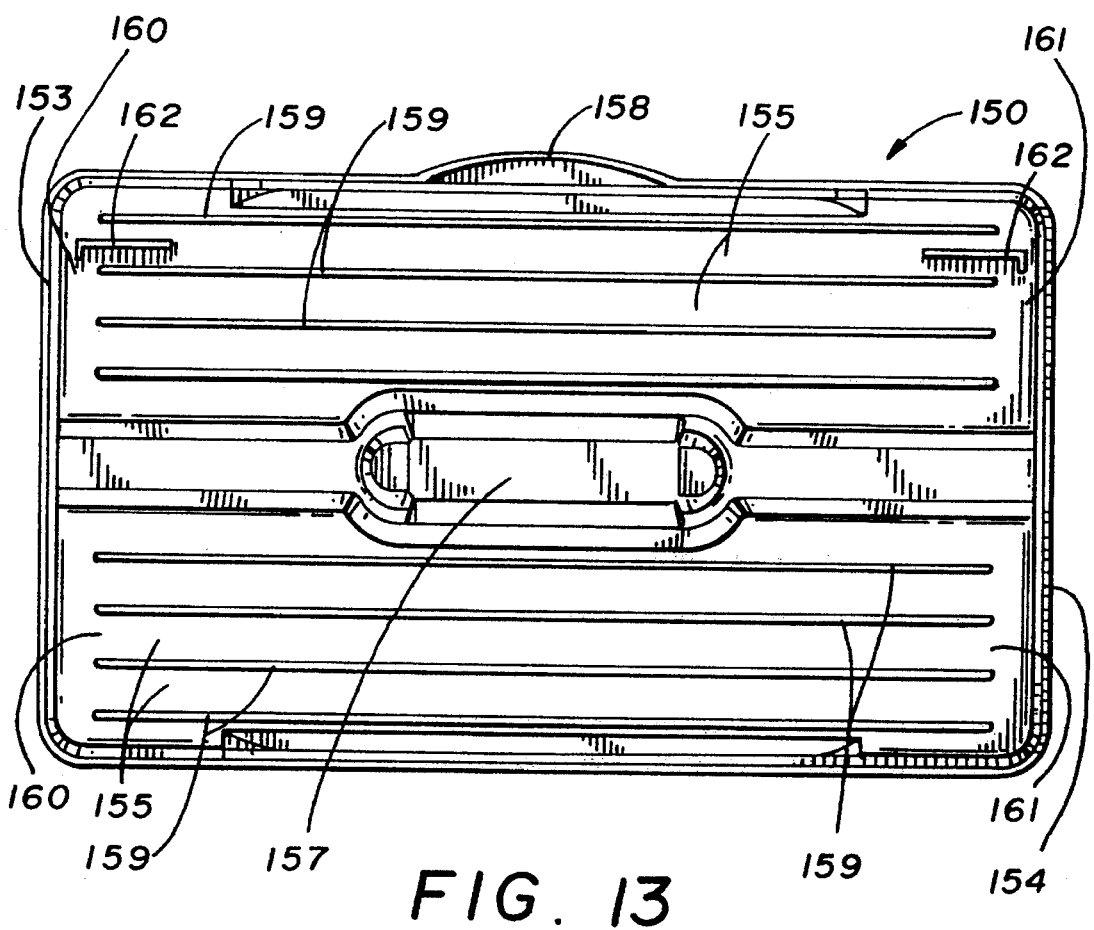
FIG. 13 is a bottom plan view of the tray of FIG. 12.
Figure 14:
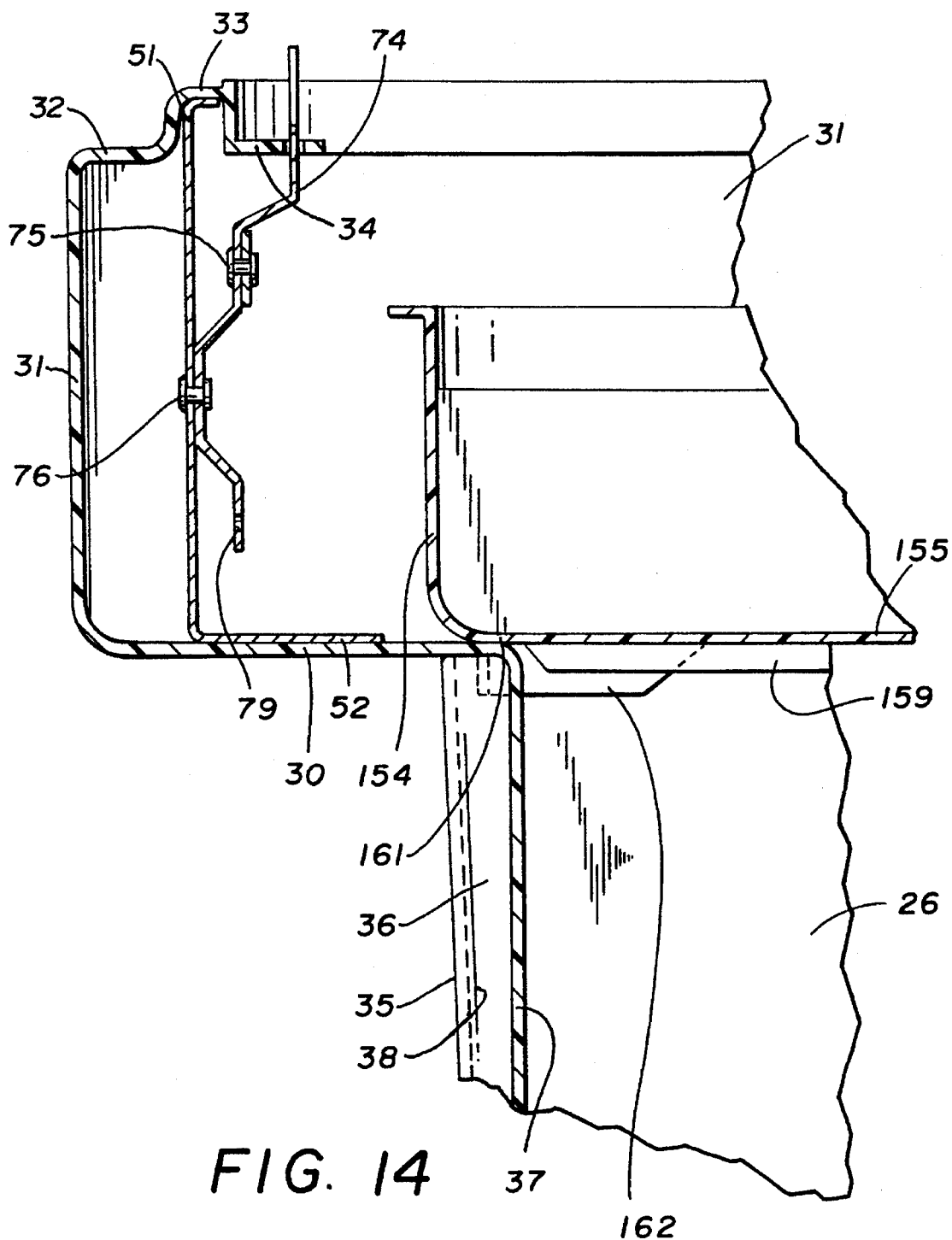
FIG. 14 is a fragmented sectional view taken substantially along line 14—14 of FIG. 2 and showing the manner in which the tray of FIGS. 12 and 13 is carried in the truck box.

Truck box 20, as just described, may be provided with a number of accessory items. For example, a tray, generally indicated by the numeral 150, may be positioned within truck box 20 as shown in FIG. 2. Tray 150 and the manner in which it is uniquely positioned in truck box 20 is best shown in FIGS. 12–14. As shown in FIG. 12, the upper features of tray 150 are rather conventional. Side walls 151, 152 and end walls 153, 154 extend upwardly from a bottom surface 155 to form the tray 150 with an open top. Tray 150 may be divided into compartments, as desired, typically by members such as divider walls 156. A carrying handle 157 may also be provided and may be conveniently formed atop divider walls 156. Also, the top of side wall 151 is shown as having a lift tab 158 extending generally horizontally outwardly therefrom for purposes to be hereinafter described.

The underside of tray 150 is best shown in FIG. 13. A plurality (eight shown) of locator ribs 159 depend downwardly from bottom surface 155. Ribs 159 extend longitudinally along bottom surface 155 from a point spaced from end wall 153, as at area 160, to a point spaced from opposed end wall 154, as at area 161. As shown in FIG. 14, when tray 150 is positioned in truck box 20, areas 160 (not shown) and 161 rest on base portion ledge 30. Tray 150 is not allowed to slide on ledge 30 within truck box 20 in a front-to-back or back-to-front direction, as could otherwise readily happen as the vehicle carrying box 20 started or stopped, because ribs 159 will prevent such from happening by engaging inner ribs 37 below ledge 30.

Tray 150 is also maintained laterally or side-to-side in truck box 20. To that end, locator feet 162 depend from tray bottom surface 155. As shown in FIG. 13, there are preferably two feet 162 located near the side wall which carries lift tab 158, that is, side wall 151. As shown, feet 162 are positioned laterally between adjacent ribs 159 and extend longitudinally outwardly of ribs 159, that is, into areas 160 and 161. When tray 150 is positioned in truck box 20, feet fit into the depressions 38 formed between ribs 37 on the inside of front wall 28 and back wall 29. As such, a tray 150 cannot move laterally in truck box 20 as might otherwise readily occur if, for example, the vehicle carrying truck box 20 turned a corner at a reasonably high rate of speed. But despite the fact that tray 150 is positively laterally positioned, it can be readily repositioned without having to physically lift a potentially heavy tray 150 full of equipment out of truck box 20. To that end, all one has to do is to lift the lift tab 158 slightly and that side of tray 150 can be raised enough to raise feet 162 above and out of depressions 38. Tray 150 may then be slid laterally and the subsequent release of tab 158 repositions feet 162 is another depression 38 to locate tray 150 at a different lateral position in truck box 20.

Figure 15:
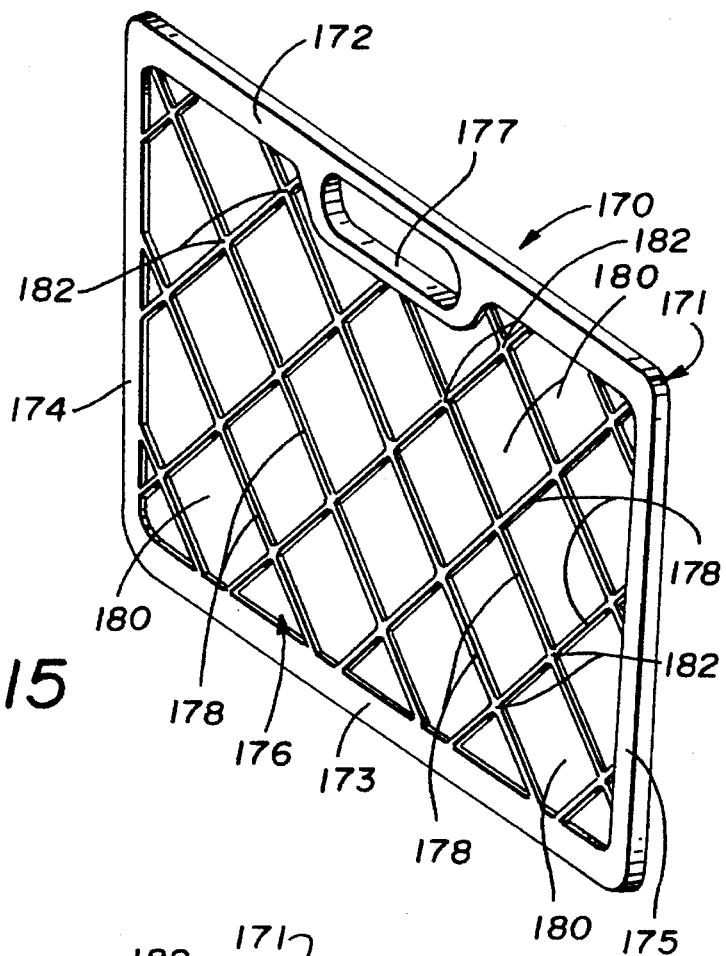
FIG. 15 is a perspective view of a divider plate which is shown in FIG. 2 positioned in the truck box.
Figure 16:
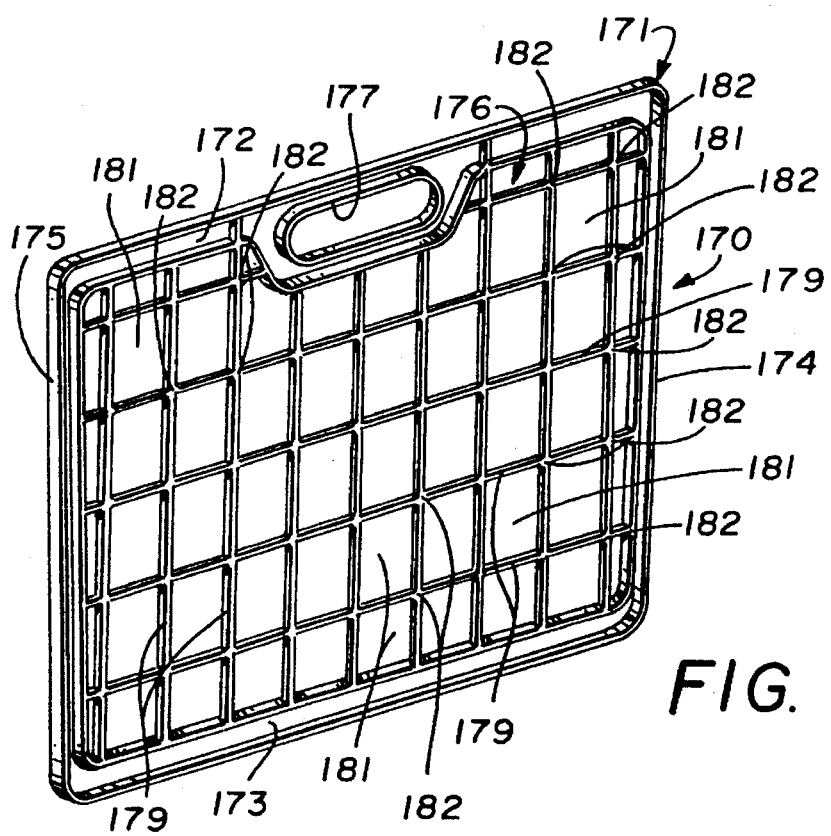
FIG. 16 is a perspective view of the other side of the divider plate of FIG. 15.

The contents of truck box 20 can be segregated or otherwise organized by means of divider plates, one of which is shown in FIG. 2 and generally indicated by the numeral 170. The details of a preferred divider plate 170 are shown in FIGS. 15 and 16. Plates 170 has an outer frame 171 which includes a generally horizontal upper bar 172 and spaced lower bar 173. Upper and lower frame bars 172 and 173 are interconnected by side frame members 174 and 175 and are of a length generally corresponding to the distance between front wall 28 and back wall 29 of truck box 20. As such, side frame members are received in inner depressions 38 formed between inner ribs 37 in front wall 28 and back wall 29. A dividing wall 176 is positioned within frame 171 and upper frame bar 172 may be provided with a handle opening 177 by which divider plates 170 may be readily lifted. Thus, divider plates 170 may be positioned at any desired depression 38 location within box 20 and wall 176 divides or segregates its contents. Because side frame members 174 and 175 are preferably approximately the same height as base container walls 26, 27, 28 and 29, essentially complete compartmentalization of truck box 20 can be accomplished.

So that dividers 170 can be sturdy yet be lightweight and inexpensively manufactured, one pattern of intersecting strengthening ribs 178 are provided on one side of wall 176 and another pattern of intersecting strengthening ribs 179 are provided on the other side of wall 176. It has been found that by providing two different patterns as shown in FIGS. 15 and 16, more strength is provided than if a single pattern were employed. Thus, ribs 178 are generally diagonal or angular with respect to frame members 174, 175 to form diamond-shaped spaces 180 therebetween and ribs 179 are parallel to frame bars 172, 173 as well as frame members 174, 175 to form rectangular or square-shaped spaces 181 therebetween.

It has also been found that if at least some of the intersections of ribs 179 are at the same location as intersections of ribs 178 but, of course, on opposite sides of wall 176, additional strength may be provided to dividers 170. Thus, the intersections 182 of ribs 178 are also identified as numeral 182 in FIG. 16 with reference to selected intersections of ribs 179. From a review of FIG. 16, it can be determined that common intersections 182 alternate, both vertically and horizontally, with non-common intersections in a checkerboard-like manner. Thus, sturdy and rigid dividers can be inexpensively manufactured to be selectively positioned in truck box 20 to divide the same into compartments, as desired, with the dividers 170 being able to withstand the abuse of being contacted by items which may move within truck box 20.

In view of the foregoing, it should be appreciated that a truck box constructed in accordance with the concepts of the present invention, as described herein, accomplishes the objects of the present invention and otherwise substantially improves the art.

We claim:

1. A container comprising a base portion having a bottom surface, opposed front and rear walls extending upwardly from said bottom surface, and opposed end walls joined to said front and rear walls and with said front and rear walls forming an open top; a cover for closing said open top; and a latch assembly for selectively latching said cover to said base portion; said latch assembly including a first latch hook pivotal on a pivot point from a position engaging said cover to a position releasing said cover, a second latch hook pivotal on a pivot point from a position engaging said cover to a position releasing said cover, a first latch handle pivotally received in one of said opposed end walls, a second latch handle pivotally received in the other of said opposed end walls, and operating means connecting said handles to said latch hooks so that upon pivoting one said handle, both said latch hooks will pivot to release said cover without moving the other said handle.

2. A container according to claim 1 wherein said operating means includes a first drawbar connected at one end to said first latch hook at a point below said pivot point, a first linkage between said first handle and the other end of said first drawbar, a second drawbar connected to said first and second latch hooks at a point above said pivot points, a second linkage between said second handle and an end of said second drawbar, said first and second linkages being movable upon pivoting of said first and second handles, respectively, to move said first drawbar in one direction and said second drawbar in the opposite direction.

3. A container according to claim 2 further comprising means to lock said latch assembly to prohibit its operation by blocking the movement of said second drawbar in said opposite direction.

4. A container according to claim 2 further comprising a return spring connected between said base portion and said second latch hook at a point below said pivot point, said return spring moving said first drawbar in said opposite direction and said second drawbar in said one direction upon release of said first or second handles.

5. A container according to claim 2 wherein said other end of said first drawbar is provided with a slot, one end of said first linkage being received in said slot such that when said first handle is pivoted, said first drawbar and said second drawbar are moved in said opposite direction, and when said second handle is pivoted, said end of said first linkage moves in said slot.

6. A container according to claim 5 wherein said end of said second drawbar is provided with a slot, one end of said second linkage being received in said slot of said second drawbar such that when said second handle is pivoted, said first drawbar is moved in said first direction and said second drawbar is moved in said opposite direction, and when said first handle is pivoted, said end of said second linkage moves in said slot of said second drawbar.

7. A container according to claim 1 further comprising a spring carried by said base portion and biasing said cover upwardly so that upon release of said cover by said latch hooks, said cover will move upwardly.

8. A container according to claim 7 wherein the top of said latch hooks are provided with a bevelled surface so that upon pushing said cover down on said latch hooks, the bias of said spring will be overcome and said cover will engage said bevelled surfaces of said latch hooks to pivot said latch latch hooks so that said cover can be reengaged.

9. A container according to claim 1 further comprising at least one hinge mechanism pivotally connecting said cover to said rear wall; each said hinge mechanism including a hinge pin assembly carrying said cover and a retainer assembly; said hinge pin assembly having a hinge pin; said retainer assembly having clip members adapted to receive said hinge pin, and means to hold said hinge pin within said clip members so that said hinge pin may rotate within said clip members; said hinge pin assembly including means rotatable with said hinge pin to engage said cover; said rear wall having a pocket formed near the top thereof to receive and engage said retainer assembly so that said cover can pivot with respect to said base portion.

10. A container according to claim 1 further comprising a generally horizontal ledge formed inside of said base portion around the periphery of and near the open top; a tray positionable in said base portion; said tray having a bottom surface and opposed side walls and opposed end walls extending upwardly therefrom; a plurality of ribs depending downwardly from said bottom surface and extending generally parallel to one set of said opposed tray walls and terminating at ends short of the other set of said opposed tray walls so that the periphery of said bottom surface at said other set of opposed tray walls can rest on said ledge, said ends of such ribs being positioned below said ledge to prevent significant movement of said tray in a direction parallel to said one set of opposed tray walls.

11. A container according to claim 10 further comprising aligned ribs formed on the inside of said front and rear walls, with aligned recesses formed between adjacent of said ribs, and means carried by said bottom surface of said tray and received in selected of said recesses to locate said tray in said base portion and prevent said tray from moving in a direction between said end walls.

12. A container according to claim 1 further comprising aligned ribs formed on the inside of said front and rear walls with aligned recesses formed between adjacent of said ribs; and means positionable in selected of said recesses to divide the container, said means to divide being at least one plate-like structure having a first pattern of intersecting reinforcing ribs on one side thereof and a second, different pattern of intersecting reinforcing ribs on the other side thereof.

13. A container comprising a base portion having a bottom surface, opposed front and rear walls extending upwardly from said bottom surface, and opposed end walls joined to said front and rear walls to form an open top; a cover for closing the open top; and at least one hinge mechanism pivotally connecting said cover to said rear wall; each said hinge mechanism including a hinge pin assembly carrying said cover, and a retainer assembly; said hinge pin assembly having a hinge pin; said retainer assembly having clip members receiving said hinge pin, and means to hold said hinge pin within said clip members so that said hinge pin may rotate within said clip members; said hinge pin assembly including means rotatable with said hinge pin to engage said cover; said rear wall having a pocket formed near the top thereof to receive and engage said retainer assembly so that said cover can pivot with respect to said base portion.

14. A container according to claim 13 wherein said means to hold said hinge pin is pivotally attached to said retainer assembly so that said hinge pin can first be positioned within said clip members and then said means to hold pivoted to engage said hinge pin.

15. A container according to claim 13, said retainer assembly further including a ledge positioned below said hinge pin to further confine said hinge pin.

16. A container according to claim 13 wherein said retainer has an outer profile and said pocket has a similar profile.

17. A container according to claim 16 wherein said retainer includes outer walls having ribs thereon, said ribs engaging said pocket in said rear wall of said base portion.

18. A container according to claim 17 wherein said retainer includes spike members engaging said pocket in said rear wall of said base portion.

19. A container according to claim 13 further comprising a generally horizontal ledge formed inside of said base portion around the periphery of and near the open top; a tray positionable in said base portion; said tray having a bottom surface and opposed side walls and opposed end walls extending upwardly therefrom; a plurality of ribs depending downwardly from said bottom surface and extending generally parallel to one set of said opposed tray walls and terminating at ends short of the other set of said opposed tray walls so that the periphery of said bottom surface at said other set of opposed tray walls can rest on said ledge, said ends of such ribs being positioned below said ledge to prevent significant movement of said tray in a direction parallel to said one set of opposed tray walls.

20. A container according to claim 19 further comprising aligned ribs formed on the inside of said front and rear walls, with aligned recesses formed between adjacent of said ribs, and means carried by said bottom surface of said tray and received in selected of said recesses to locate said tray in said base portion and prevent said tray from moving in a direction between said end walls.

21. A container according to claim 13 further comprising aligned ribs formed on the inside of said front and rear walls with aligned recesses formed between adjacent of said ribs; and means positionable in selected of said recesses to divide the container, said means to divide being at least one plate-like structure having a first pattern of intersecting reinforcing ribs on one side thereof and a second, different pattern of intersecting reinforcing ribs on the other side thereof.

22. In combination, a container and a tray positionable in said container, said container having a bottom surface, opposed front and rear walls extending upwardly from said bottom surface, and opposed end walls joined to said front and rear walls and with said front and rear walls forming an open top; a generally horizontal ledge formed inside of said container around the periphery of and near the open top; said tray having a bottom surface and opposed side walls and opposed end walls extending upwardly therefrom; a plurality of ribs depending downwardly from said bottom surface and extending generally parallel to one set of said opposed tray walls and terminating at ends short of the other set of said opposed tray walls so that the periphery of said bottom surface at said other set of opposed tray walls can rest on said ledge, said ends of said ribs being positioned below said ledge to prevent significant movement of said tray in a direction parallel to said one set of opposed tray walls.

23. The combination of claim 22 wherein said front and rear walls of the container have aligned ribs formed on the inside thereof with aligned recesses formed between adjacent of said ribs, said tray including means carried by said bottom surface of said tray and received in selected of said recesses to locate said tray in the container and prevent said tray from moving in a direction between said end walls.

24. The combination of claim 23 wherein said tray includes a lift tab positioned generally on top of the said wall closest to said means to locate so that said means to locate can be removed from said recesses without totally lifting said tray.

25. The combination of claim 22 wherein said front and rear walls of the container have aligned ribs formed on the inside thereof with aligned recesses formed between adjacent of said ribs; and further comprising the combination of means positionable in selected of said recesses to divide the container, said means to divide being at least one plate-like structure having a first pattern of intersecting reinforcing ribs on one side thereof and a second, different pattern of intersecting reinforcing ribs on the other side thereof.

26. In combination, a container and a tray positionable in said container, said container having a bottom surface, opposed front and rear walls extending upwardly from said bottom surface, and opposed end walls joined to said front and rear walls and with said front and rear walls forming an open top; said front and rear walls having aligned ribs formed on the inside thereof with aligned recesses formed between adjacent of said ribs; said tray having a bottom surface and opposed side walls and opposed end walls extending upwardly therefrom; and means carried by said bottom surface of said tray and received in selected of said recesses to locate said tray in the container and prevent said tray from moving in a direction between said end walls.

27. The combination of claim 26 wherein said tray includes a lift tab positioned generally on top of the said wall closest to said means to locate so that said means to locate can be removed from said recesses without totally lifting said tray.

28. The combination of claim 26 further comprising the combination of means positionable in selected of said recesses to divide the container, said means to divide being at least one plate-like structure having a first pattern of intersecting reinforcing ribs on one side thereof and a second, different pattern of intersecting reinforcing ribs on the other side thereof.

29. A container comprising a bottom surface, opposed front and rear walls extending upwardly from said bottom surface, and opposed end walls joined to said front and rear walls and with said front and rear walls forming an open top; said front and rear walls having aligned ribs formed on the inside thereof with aligned recesses formed between adjacent of said ribs; means positionable in selected of said recesses to divide the container, said means to divide being at least one plate-like structure having a first pattern of intersecting reinforcing ribs on one side thereof and a second, different pattern of intersecting reinforcing ribs on the other side thereof.

30. A container according to claim 29 wherein said plate-like structure has a hand opening near one edge thereof to form a handle.

31. A container according to claim 29 wherein said plate-like structure is of a height generally corresponding to the height of said container walls.

32. A container according to claim 29 wherein said first pattern of intersecting ribs includes generally diagonally-extending ribs forming diamond-shaped spaces therebetween and said second pattern of intersecting ribs includes ribs running generally parallel to the outer profile of said plate-like structure thereby forming generally square-shaped spaces therebetween.

33. A container according to claim 29 wherein there are less intersections of ribs on said one side than there are on said other side of said plate-like structure, all of said intersections on said one side being located on said plate-like structure where there are intersections on said other side of said plate-like structure.

34. A container comprising a base portion having a bottom surface, opposed front and rear walls extending upwardly from said bottom surface, and opposed end walls joined to said front and rear walls and with said front and rear walls forming an open top, and a generally horizontal ledge formed inside of said base portion around the periphery of and near the open top, said front and rear walls having aligned ribs formed on the inside thereof with aligned recesses formed between adjacent of said ribs; a cover for closing said open top; at least one hinge mechanism pivotally connecting said cover to said rear wall, each said hinge mechanism including a hinge pin assembly carrying said cover and having a hinge pin, and a retainer assembly having clip members receiving said hinge pin, said rear wall having a pocket formed near the top thereof to receive and engage said retainer assembly; a latch mechanism for selectively latching said cover to said base portion, said latch mechanism including first and second hooks pivotal from a position engaging said cover to a position releasing said cover, first and second latch handles pivotally received in said end walls, and means connecting said handles to said hooks so that upon pivoting either said handle, both said hooks will pivot without moving the other said handle; a tray positionable in said base portion, said tray having a bottom surface, opposed side walls and opposed end walls, a plurality of ribs downwardly depending from said tray bottom surface and extending generally parallel to one set of said opposed tray walls and terminating at ends short of the other set of opposed tray walls so that the periphery of said tray bottom surface at said other set of opposed tray walls can rest on said ledge, said ends of said ribs being positioned below said ledge to prevent significant movement of said tray in a direction parallel to said one set of opposed tray walls, and means carried by said tray bottom surface received in selected of said recesses to locate said tray in said base portion to prevent said tray from moving in a direction between said end walls; and plate-like means to divide said base portion into separate compartments, said means to divide being positionable in selected of said recesses and having a first pattern of intersecting ribs on one side thereof and a second, different pattern of intersecting ribs on the other side thereof.

* * * * *